United States Patent Office

3,458,469
Patented July 29, 1969

3,458,469
CURING SYSTEM FOR ROOM TEMPERATURE VULCANIZING ORGANOPOLYSILOXANE ELASTOMERS
Robert A. Murphy, Burnt Hills, N.Y., assignor to General Electric Company, a corporation of New York
No Drawing. Filed Dec. 20, 1966, Ser. No. 603,120
Int. Cl. C08g *31/10, 47/04*
U.S. Cl. 260—37                                                    6 Claims

ABSTRACT OF THE DISCLOSURE

A composition comprising a silicon-hydrogen terminated organopolysiloxane, an organosilicon material having more than 2 silicon-bonded hydrogen substituents per molecule and a platinum catalyst.

---

This invention relates to a system for curing room temperature vulcanizing organopolysiloxane elastomers. More particularly, this invention relates to the curing of silanol and silicon-hydrogen terminated oryanopolysiloxanes to the solid, elastomeric state with, in combination, an organosilicon material having more than two silicon-bonded hydrogen substituents per molecule and a platinum catalyst.

A large number of systems have been proposed in the prior art to effect the cure of a room temperature vulcanizing organopolysiloxane composition. Many of the systems which have been described provide severe disadvantages in that the by-products generated from the cure system, such as, acids, are corrosive. Often, these by-products are not only corrosive, but provide a noxious odor. Many of the catalyst systems employed prevent the formation of a clear, transparent elastomeric material. Such a clear material is often important, for example, in encapsulation processes.

In accordance with the present invention, I have unexpectedly discovered that both silanol terminated and silicon-hydrogen terminated organopolysiloxane fluids can be cured at room temperature employing, in addition to a platinum catalyst, an organosilicon compound having more than two silicon-bonded hydrogen substituents per molecule. The by-product of the reactions are hydrogen and/or water. Thus, the by-products are neither corrosive nor odor-producing. While I do not wish to be bound by theory, I believe that the cure mechanism involves the following reaction:

(1) 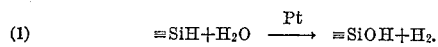

Thus, in the presence of atmospheric moisture, platinum or platinum compounds catalyze the reaction of the silicon-bound hydrogen substituent to a silanol group. In subsequent reactions, the silanol groups condense to siloxane bonds according to the following reaction:

(2) 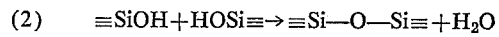

Thus, neither the by-product of the first reaction nor the by-product of the second reaction are materials presenting problems of corrosion or odor. Since the silicon-hydrogen compounds employed according to the present invention have more than two silicon-hydrogen groups per molecule, sites are provided for cross-linking to form the elastomeric polymer.

The organopolysiloxane fluids convertible to the cured, solid, elastic state having silanol terminals are generally linear polymers formed from cyclic organopolysiloxanes. The most suitable starting materials for these silanol-terminated organopolysiloxanes have been found to be the cyclic organopolysiloxanes of the general formula:

(3) $(RR'SiO)_n$ where R and R' are organic radicals selected from the class consisting of alkyl radicals, e.g., methyl, ethyl, propyl, butyl, hexyl, etc.; aryl radicals, e.g., phenyl, biphenyl, naphthyl, etc.; alkaryl radicals, e.g., tolyl, xylyl, ethylphenyl, etc.; aralkyl radicals, e.g., benzyl, phenethyl, etc.; and haloaryl radicals, e.g., chlorophenyl, tetrachlorophenyl, dichlorophenyl, etc.; and $n$ is an integer equal to at least 3, e.g., from about 3 to 10, depending on the organic groups in the starting organopolysiloxane.

The silanol-terminated organopolysiloxanes are generally linear, fluid, methyl polysiloxanes containing terminal silicon-bonded hydroxy groups and having an average of about two methyl groups per silicon atom. These materials are well known in the art and can be prepared, for example, by starting with cyclic dimethylpolysiloxanes having the formula:

(4) $[(CH_3)_2SiO]_n$ where $n$ is as previously defined. Among the preferred cyclic dimethylpolysiloxanes employed as starting materials can be mentioned, for example, hexamethylcyclotrisiloxane, octamethylcyclotetrasiloxane, and decamethylcyclopentasiloxane, as well as mixtures of these cyclic dimethylpolysiloxanes, alone, or with higher cyclopolysiloxanes.

In preparing the linear, fluid dimethylpolysiloxanes containing terminal silicon-bonded hydroxy groups, the starting cyclic dimethylpolysiloxanes are advantageously heated at temperatures of from about 125° to 150° C. with small amounts of a siloxane rearrangement and condensation catalyst (about 0.001 to 0.01 percent, by weight, based on the weight of the cyclic organopolysiloxane), such as potassium hydroxide, tetrabutylphosphonium hydroxide, etc. The temperature and time at which this heating takes place will vary depending on such factors as the particular cyclic dimethylpolysiloxane employed, the siloxane rearrangement and condensation catalyst employed, the concentration of the catalyst, the desired viscosity, etc. In general, the polymerization is carried out for a time sufficient to obtain a high molecular weight product of about 150,000 to 2,000,000 centipoises viscosity, when measured at 25° C. Generally, this product is obtained in a time which varies from a few minutes to 4 to 6 or more hours, depending on the reactants and the conditions of reaction.

The high molecular weight product thus obtained is then treated with water to reduce its viscosity to about 500 to 20,000 centipoises at 25° C. This can be accomplished by blowing steam across the surface of the high molecular weight product for a sufficient time to give the lower viscosity material having terminal silicon-bonded hydroxy groups. Instead of blowing steam across the surface of the high molecular weight product, the steam can also be forced through the product. The resulting linear, fluid dimethylpolysiloxane containing terminal silicon-bonded hydroxy groups will have the general formula:

(g) 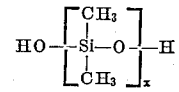

where $x$ is a whole number greater than 1, e.g., from 2 to 100 or more. Such compositions and methods for preparing the same are more particularly described in U.S. Patent No. 2,607,792—Warrick. The use of steam in this fashion causes a decrease in the viscosity of the high molecular weight product, at the same time forming linear polysiloxanes having the terminal silicon-bonded hydroxy groups.

An alternative method for making the linear fluid dimethylpolysiloxanes containing terminal silicon-bonded hydroxy groups comprises adding water to the high molecular weight polymers described above in such amounts that when heated at elevated temperatures, for instance, from about 150° to 170°, the viscosity is reduced to the desired level of 500 to 20,000 centipoises. The amount of water used will vary depending on such factors as the molecular weight of the polymer being treated, the time and temperature at which the polymer being treated will be heated, the ultimate viscosity desired, etc. The amount of water used to reduce the molecular weight can be readily deteemined. For example, a linear fluid dimethylpolysiloxane containing terminal silicon-bonded hydroxy groups and having a viscosity of from 1,000 to 2,000 can be obtained by heating a high moleculac weight dimethylpolysiloxane prepared in accordance with the directions above, of about 2,000,000 centipoises viscosity, with 0.5 percent, by weight, of water for about 2 hours at 150° to 170° C.

While the polydimethylsiloxane having silanol chain terminals is generally peeferred, up to about 50 percent of the polysiloxane can be formed with siloxy units containing the other organic radicals mentioned above. For example, a mixture of octamethylcyclotetrasiloxane and a cyclic polymer of ethylmethylsiloxane having the formula:

(6)     $[(CH_3)(C_2H_5)SiO]_n$ where $n$ is as previously defined, can be employed. Additionally, mixtures of cyclic polymers of polydimethylsiloxane with cyclic polymers of polydiphenylsiloxane, polymethylphenylsiloxahe, etc., are useful as starting materials for the preparation of silanol-terminated organopolysiloxanes for use in accordance with this inventon.

As previously mentioned, the organopolysiloxane which is to be cured to the solid, elastomeric state can also be a linear polysiloxane having silicon-bonded hydrogen terminal groups. These materials have the general formula:

(7) 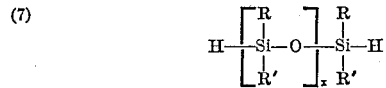

where R, R', and $x$ are as previously defined. Such materials, and methods for forming them are well known in the art, as described, for example, in U.S. Patent No. 2,491,843—Wilcock.

The platinum catalyst to be employed in the present invention should be used in an amount of from about 0.0005 to 0.5 part, as platinum, per 100 parts by weight of the linear organopolysiloxane having functional chain terminals to be converted to the cured, solid, elastomeric state. This platinum can be in the form of any of the materials generally utilized in SiH—Si-olefin reactions. Among the forms of this platinum are element platinum, as shown in U.S. Patent No. 2,970,150—Bailey and Platinum-on-charcoal, platinum-on-gamma - alumina, platinum-on-silica gel, platinum-on-asbestos, chloroplatinic acid $(H_2PtCl_6 \cdot 6H_2O)$, as mentioned in U.S. Patent No. 2,823,218—Speier. Further, the platinum-containing can be selected from those having the formula $(PtCl_2 \cdot olefin)_2$ and $H(PtCl_3 \cdot olefin)$, as described in U.S. Patent No. 3,159,601—Ashby. The olefin shown in the previous two formulas can be almost any type of olefin, but it is preferably an alkene having from 2 to 8 carbon atoms, a cycloalkene having from 5 to 7 carbon atoms, or styrene. Specific olefins utilizable in the above formulas are ethylene, propylene, the various isomers of butylene, octylene, cyclopentene, cyclohexene, cycloheptene, etc. A further platinum-containing material useable in the composition of the present invention is the platinum chloride-cyclopropane complex $(PtCl_2 \cdot C_3H_6)_2$ described in U.S. Patent No. 3,159,662—Ashby.

Still further, the platinum-containing material can be a complex formed from a chloroplatinic acid with up to 2 moles per gram-atom of platinum of a member selected from the class consisting of alcohols having the formula R"OH, ethers having the formula R"OR'", aldehydes having the formula R"CHO, and mixtures of the above as described and claimed in U.S. Patent No. 3,220,972—Lamoreaux. The substituent R" in the above formulas is a member selected from the class consisting of alkyl radicals having at least 4 carbon atoms, alkyl radicals substituted with an aromatic hydrocarbon radical, and alkyl radicals substituted with an OR'" group, where R'" is a member selected from the class consisting of monovalent hydrocarbon radicals free of aliphatic unsaturation and monovalent radicals free of aliphatic unsaturation and consisting of carbon, hydrogen, and oxygen atoms, with each oxygen atom being attached to 2 atoms, at least one of which is a carbon atom and up to one of which is a hydrogen atom.

The organosilicon material with more than two siliconbonded hydrogen substituents per molecule is a liquid having a viscosity of no more than about 20 centistokes at 25° C. and contains from about 2.1 to 25 siliconbonded hydrogen atoms per molecule. Particularly useful silicon-hydrogen compounds are those selected from the class consisting of:

(8)     $ZSiH_3$ (9) 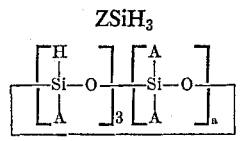

and

(10)     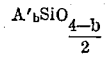

where Z is selected from the class consisting of alkyl radicals of at least 4 carbon atoms, phenyl radicals, and tolyl radicals; A is selected from the class consisting of lower alkyl radicals, phenyl radicals, and tolyl radicals; A' is a monovalent hydrocarbon radical as defined for A and, in addition from 2.1 to 25 A' substituents in each molecule of Formula 10 are hydrogen with there being from 0.1 to 1.0 Si-H group per silicon atom; $a$ is from 0 to 3; and $b$ is from 1.98 to 2.67. Included among the alkyl radicals represented by Z are butyl, isobutyl, amyl, hexyl, heptyl, decyl, etc. Preferably, the alkyl radical is no larger than eicosyl, or 20 carbon atoms, and still more preferably, the radical is no larger than dodecyl, or 12 carbon atoms. Among the alkyl radicals which A can represent are methyl, ethyl, propyl, butyl, hexyl, etc. Among the materials defined by generic Formula 10 are such fluids as:

(11)     $CH_3[SiMeHO]_{10}[SiMe_2O]_{10}SiMe_2H$

(12)     $Me_3SiO[SiMeHO]_3SiMe_3$

(13)     $Me_3SiO[SiMeHO]_{20}SiMe_3$ where Me is methyl. Chain length and location of the silicon-bonded hydrogen substituent are not particularly important in the material of Formula 9 or 11. Rather, it is the fact that the material contains the indicated number of silicon-bonded hydrogen substituents which allows for a cross-linking reaction when the hydrogen groups are converted to hydroxyl groups by atmospheric moisture in the presence of platinum. Methods of forming such materials are well known in the art.

The hydrogen materials of Formulas 8, 9 and 10 should be employed in such an amount that there are from 2 to 200 silicon-bonded hydrogen substituents for each silanol or silicon-bonded hydrogen terminated organopolysiloxane which is to be cured to the solid, elastomeric state.

Where transparency is not important various fillers can also be incorporated in the room temperature vulcanizing compositions of the present invention. Among these fillers are, for example, titanium dioxide, lithopone, zinc oxide, zirconium silicate, silica aerogel, iron oxide, diatomaceous earth, calcium carbonate, fumed silica, precipitated silica, glass fibers, etc. The amount of filler can vary within wide limits, for example, from about 5 to 300 parts of filler, by weight, per 100 parts of the silanol-terminated organopolysiloxane or per 100 parts of the silicon-bonded hydrogen terminated organopolysiloxane of Formula 7. Preferably, the filler is present in an amount of from about 10 to 100 parts, per 100 parts of the just mentioned organopolysiloxanes. Additionally, various processing aids and other materials which are often employed in room temperature vulcanizing organopolysiloxane compositions can be employed with the curing system of the present invention.

The various components of the room temperature vulcanizing system described above can be mixed in any order. If desired, these components can be mixed in a solvent and applied from such a solution, the solvent being evaporated soon after application. Any non-polar, non-reactive organic solvent can be used, preferably, an aromatic solvent such as benzene or toluene. The amount of solvent, in such a case, should be that sufficient to dissolve the various components. The only requirement in mixing the various components, is that the mixing be done in the absence of moisture, including atmospheric moisture.

The room temperature vulcanizing composition of the present invention must be kept free of moisture during mixing and prior to cure, as it is the moisture which initiates the curing mechanism. In the absence of moisture the compositions are stable. To begin cure, such a room temperature vulcanizing system is applied, for example, to a surface, and contact with atmospheric moisture initiates the cure. Curing can be conducted at any temperature from about ambient up and the use of heat accelerates the rate of cure. Under ambient conditions, cure is accompilshed in from about 48 hours to about 1 week.

In order that those skilled in the art may better understand the practice of the present invention the following examples are given as illustrations. These examples should not be considered as limiting in any way the full scope of the invention as covered in the appended claims. All parts in these examples are by weight.

The platinum catalyst employed in several of the following examples was obtained by dissolving one mole of $H_2PtCl_6 \cdot 6H_2O$ in seven moles of octyl alcohol. This platinum-alcohol solution was maintained at a temperature of 75°–80° C. and at a pressure of approximately 15 to 20 mm. for 60 hours while the ratio of chlorine to platinum was reduced to 2 atoms of chlorine per atom of platinum. The water and hydrogen chloride which resulted were removed by holding the temperature at 75°–80° C. The resulting product will hereinafter be referred to as the organic platinum complex.

Example 1

A quantity of 680 parts of a silicon-hydrogen terminated polydimethylsiloxane fluid having a viscosity of 10,000 centistokes at 25° C., 68 parts of amyl silane, and 0.28 part, as platinum, of the organic platinum complex were mixed. The silicon-hydrogen terminated polydimethylsiloxane had a structure as shown in Formula 7 where each R and R' substituent was methyl. The amyl silane had the structure:

(14)             $C_5H_{11}SiH_3$ corresponding to the material of Formula 8 where Z is the $C_5H_{11}$— radical. This mixture was applied to a clean surface exposed to the air. Over a period of about three days, the mixture cured to a bubble-free, transpraent elastomer.

Example 2

A mixture was formed containing 721 parts of a silicon hydrogen terminated polydimethylsiloxane fluid with a viscosity of 3,000 centistokes at 25° C., 74 parts of amyl silane, and 0.07 part, as platinum, of the organic platinum complex. The polydimethylsiloxane fluid had a structure equivalent to that of Formula 7 where each R and R' substituent was methyl. This mixture was applied to a clean surface in the presence of atmospheric moisture. After about five days, the mixture cured to a bubble-free, transparent elastomer with a faint yellow color.

Example 3

A mixture was formed from 100 parts of a silanol-terminated polydimethylsiloxane fluid with a viscosity of 2,800 centistokes at 25° C., 10 parts of amyl silane, and 0.03 part, as platinum, of the organic platinum complex. This material was applied to a clean surface exposed to atmospheric air and cured to a bubble-free, transparent elastomer in about 24 hours.

Example 4

A mixture is formed comprising 100 parts of the silanol-terminated polydimethylsiloxane fluid of Example 3, 12 parts of hexylsilane, 0.01 part, as platinum, of chloroplatinic acid, and 20 parts of precipitated silica. This mixture is applied to a clean surface exposed to the atmosphere and cures to a bubble-free, opaque elastomer in about 48 hours.

The composition of my invention can be employed, for example, to encapsulate electrical components. Thus, a silicon semi-conductor is suspended within a mold. A quantity of the formulation described in Example 1 is placed within the mold around the semi-conductor. In about 24 hours the room temperature vulcanizing composition is sufficiently cured to remove the mold. Curing continues for about another 24 hours and the semi-conductor is obtained encapsulated in a bubble-free, transparent elastomer capsule.

In accordance with the illusrtations shown above it can be seen that a room-temperature vulcanizing system has been provided which allows the formation of bubble-free, transparent elastomeric materials, in the absence of corrosive or noxious by-products, at room temperature.

The specific formulations and methods of formation just described should not be considered as limiting in any way the full scope of the invention as covered in the appended claims.

What I claim as new and desire to secure by Letters Patent of the United States is:

1. A composition of matter stable under anhydrous conditions and curable to the solid, elastomeric state in the presence of moisture comprising:
   (a) a silicon-hydrogen terminated polydiorganosiloxane fluid having a viscosity of about 500 to 20,000 centistokes at 25° C.
   (b) an organosilicon compound containing more than 2 silicon-bonded hydrogen substitutents per molecule and being a liquid having a viscosity less than about 20 centistokes at 25° C. and selected from the class consisting of:

 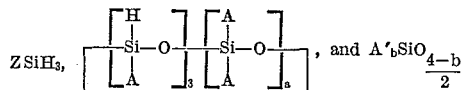

where Z is selected from the class consisting of alkyl radicals of at least 4 carbon atoms, phenyl radicals, and tolyl radicals; A is selected from the class consisting of lower alkyl radicals, phenyl radicals, and tolyl radicals; A' is a member selected from the class consisting of hydrogen, lower alkyl radicals, phenyl radicals, and tolyl radicals; from about 2.1 to 25 of the A' substituents in each molecule being hydrogen; with there being from 0.1 to 1.0 silicon-bonded hydrogen atoms of each silicon atom of the polysiloxanes, $a$ is a whole number equal to from 0 to 3, inclusive, and $b$ has a value of from 1.98 to 2.67; said organosilicon composition being present in such amount that there are from 2 to 200 silicon-bonded hydrogens for each molecule of said polydiorganosiloxane fluid and (c) a platinum catalyst in an amount of from 0.0005 to 0.5 part platinum per 100 parts of said polydiorganosiloxane fluid.

2. The composition of claim 1 containing, in addition, from 5 to 300 parts by weight, based on the polydiorganosiloxane fluid, of an inorganic filler.

3. Composition of claim 1 wherein (b) is represented by: $ZSiH_3$

4. Composition of claim 3 wherein Z is alkyl.
5. Composition of claim 3 wherein Z is phenyl.
6. Composition of claim 3 wherein Z is amyl.

References Cited

UNITED STATES PATENTS

| | | |
|---|---|---|
| 2,814,601 | 11/1957 | Currie et al. |
| 2,967,170 | 1/1961 | Merker _____ 260—46.5 |
| 3,050,485 | 8/1962 | Nitzsche et al. |
| 3,338,847 | 8/1967 | Nitzsche et al. |

MORRIS LIEBMAN, Primary Examiner

L. T. JACOBS, Assistant Examiner

U.S. Cl. X.R.

260—46.5